United States Patent
Ali et al.

(10) Patent No.: US 9,258,121 B2
(45) Date of Patent: Feb. 9, 2016

(54) METHOD TO MANAGE MODIFICATION OF ENCRYPTION CREDENTIALS

(71) Applicant: Gemalto Inc., Austin, TX (US)

(72) Inventors: Asad Mahboob Ali, Austin, TX (US); Ella Segura, Austin, TX (US)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/310,549

(22) Filed: Jun. 20, 2014

(65) Prior Publication Data
US 2015/0372814 A1     Dec. 24, 2015

(51) Int. Cl.
*H04L 29/06* (2006.01)
*H04L 9/08* (2006.01)
*H04L 9/32* (2006.01)

(52) U.S. Cl.
CPC ............ *H04L 9/0894* (2013.01); *H04L 9/3226* (2013.01); *H04L 9/3234* (2013.01)

(58) Field of Classification Search
CPC ....... H04L 63/08; H04L 63/083; H04L 9/321; H04L 63/0428; H04W 12/06
USPC ....................................................... 713/155
See application file for complete search history.

(56) References Cited

U.S. PATENT DOCUMENTS

| | | | |
|---|---|---|---|
| 2009/0254572 A1* | 10/2009 | Redlich et al. | 707/10 |
| 2010/0290623 A1* | 11/2010 | Banks et al. | 380/277 |
| 2011/0047371 A1 | 2/2011 | Timby | |
| 2012/0321078 A1* | 12/2012 | Chambers et al. | 380/44 |
| 2013/0036312 A1* | 2/2013 | Anquet et al. | 713/189 |
| 2013/0061037 A1* | 3/2013 | Zhang et al. | 713/150 |
| 2014/0082717 A1 | 3/2014 | Kang | |

FOREIGN PATENT DOCUMENTS

| | | |
|---|---|---|
| EP | 1855414 A1 | 11/2007 |
| WO | 20120048347 A1 | 4/2012 |

OTHER PUBLICATIONS

International Search Report and Written Opinion issued by the International Searching Authority in corresponding PCT Application No. PCT/EP2015/062269 filed on Jun. 2, 2015 (11 pages) (mailing date: Sep. 23, 2015).

* cited by examiner

*Primary Examiner* — Kambiz Zand
*Assistant Examiner* — Stephen Sanders
(74) *Attorney, Agent, or Firm* — Buchanan Ingersoll & Rooney PC

(57) ABSTRACT

A method to manage modification of encryption credentials for an encryption server. The encryption server is used to encrypt data uploaded by a user after provision of user encryption credentials associated with an encryption account. The data is encrypted by using a user encryption key stored in a cloud storage server.

6 Claims, 1 Drawing Sheet

METHOD TO MANAGE MODIFICATION OF ENCRYPTION CREDENTIALS

FIELD OF THE INVENTION

The present invention relates to a method to manage modification of encryption credentials for an encryption server. The invention more precisely relates to encryption servers used to encrypt data then uploaded to cloud storage services on behalf of a user. This upload requires the user to provide his/her encryption credentials associated to his/her encryption account. Data thus encrypted using a user encryption key is stored then in the cloud storage service.

The invention also pertains to an encryption server adapted to manage modification of encryption credentials according to the invention.

BACKGROUND OF THE INVENTION

Cloud storage service providers often store data encrypted by an encryption service provider. In such a case, the cloud storage service provider never has access to user data, only to the encrypted data.

The encryption service provider has access to the data only when credential for the cloud storage service is provided by the user. As the user holds the credential, he is in control of his/her data.

Traditionally, a user credential such as password is used to authenticate and authorize access to a service. This user credential is typically the basis for deriving an encryption credential (e.g. encryption key) which is used for encrypting the user data. The derivation features are out of scope of the invention and will thus not be addressed in details here.

According to such derivation features, the encryption credential is classically derived from the user's login credential at the encryption server. Typically, the 'secret' input to this derivation function is a user password. Without this 'secret', the server cannot generate the encryption key.

In the case of loss, a second factor of authentication, or an out-of-band mechanism is sufficient to reset the first credential. Once the credential is reset, it is however necessary to be able to recover all the data previously stored encrypted.

The need for non-traditional credential recovery method arises in the context of such credentials being used also to derive keys for encrypting data. In such context, it is not possible to recover the keys without the original credential. It is thus not possible to recover the previously stored data.

Further alternative and advantageous solutions would, accordingly, be desirable in the art.

SUMMARY OF THE INVENTION

The present invention aims at enabling a seamless recovery of encrypted data stored in a cloud mass storage when the user credential used for deriving encryption key is lost.

The present invention is defined, in its broadest sense, as a method to manage modification of encryption credentials for an encryption server, said encryption server being used to encrypt data uploaded by an user after provision of his/her encryption credentials associated to an encryption account, data thus encrypted using a user encryption key being stored in a cloud storage server, said method comprising the initialization steps of, for the encryption server, authenticating the user to the encryption account using encryption credentials and binding the encryption account to a user's storage account in the cloud storage server through the following sub-steps:

for the storage server, authenticating the user to his/her storage account using storage credentials, issuing an initial access token based on an online authentication protocol and sending the initial access token to the encryption server, and for the encryption server, encrypting the initial access token and the user encryption key using the encryption credentials and storing them for further use to decrypt the uploaded data under request of the user and provision of his/her encryption credentials, encrypting the user encryption key using an encryption server recovery master key and sending, for storage, the encrypted user encryption key to the storage server, said method further comprising the following steps, when user triggers an encryption credentials reset, for the storage server, authenticating the user to his/her storage account using storage credentials, issuing a new access token based on an online authentication protocol and sending the new access token to the encryption server, and for the encryption server, using the new access token to retrieve the encrypted user encryption key from the storage server, decrypting the encrypted user encryption key using the encryption server recovery master key, requiring new encryption credentials to be input by the user, encrypting the new access token and the plain user encryption key using the new encryption credentials and storing them for further use to decrypt the uploaded data under request of the user and provision of his/her new encryption credentials.

This invention is advantageously used in solutions where data are encrypted before being stored in a cloud mass storage. The combination of the use of access token and of an encryption of the encryption key using a recovery master key enables a seamless recovery of data stored in the cloud whatever occurs in terms of modification of encryption credentials, in particular when the user credential used for deriving encryption keys is lost, for example, when users forget their account password.

Furthermore, if the user forgets his/her credential to both the cloud storage server and the encryption server, he/she will still be able to reset the credential on the storage server and then recover the credential for the encryption server using the same process. In this case, the independent recovery of the storage server credentials is used.

In a particular implementation of the invention, encryption credential is a user name/password pair.

Such an implementation is convivial for users.

According to an advantageous feature, the password is used to encrypt the initial access token and the user encryption key.

This feature enables to implement the invention using directly the credential as provided by the user.

Advantageously, the password is used as an input to a key derivation function, and the resulting key is used to encrypt the initial access token and the user encryption key.

This feature enables to diversify the keys used to encrypt the sensitive data. A higher security level is here accessible.

According to an implementation, the online authentication protocol is a three-steps OAuth handshake.

Such a protocol enables to generate access token in a reliable way.

The present invention also relates to an encryption server adapted to manage modification of encryption credentials according to the method of the invention, said encryption server being used to encrypt data uploaded by an user after provision of his/her encryption credentials associated to an encryption account, data thus encrypted using a user encryption key being stored in a cloud storage server, said encryption server including:

> an authentication module to authenticate the user to the encryption account using encryption credentials,
>
> an encryption/decryption module to encrypt/decrypt access tokens as provided by the storage server and the user encryption key using the encryption credentials, to encrypt/decrypt uploaded data using user encryption key, to encrypt/decrypt the user encryption key using an encryption server recovery master key before sending to the storage server and when the encrypted user encryption key is retrieved from storage device,
>
> a memory to store access token and user encryption key encrypted using the encryption credentials,
>
> a link with human machine interface for the user to input new encryption credentials.

Such a server having its own credentials recovery and modification requirements independently from the invention is able to provide a seamless recovery of data as stored after encryption in any storage server with which it is bound according to the invention. The human interface is typically a displayed webpage on a personal computer.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed.

Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
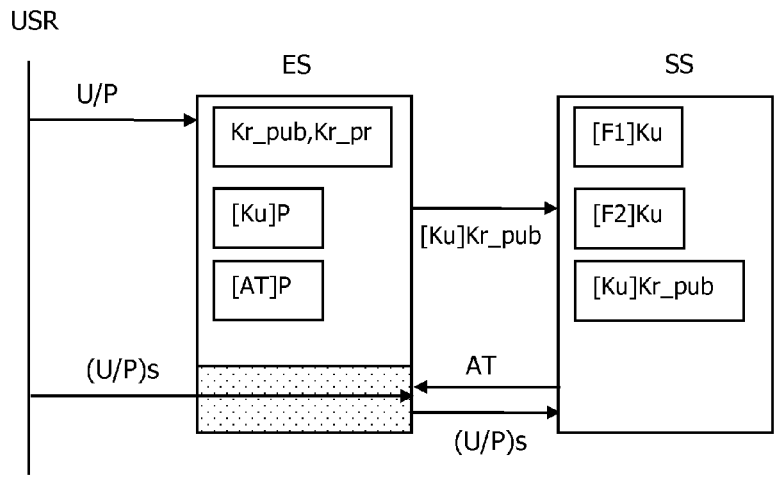
FIG. 1 illustrates the initialisation part of the method of the invention.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same reference numerals in the different drawings. For clarity, only those elements and steps which are useful to the understanding of the present invention have been shown in the drawings and will be described. The term "server" is here used to designate any individual or group of physical machines implementing a service, here of encryption or of storage.

FIG. 1 schematically illustrates the initialization part of the method of the invention. At this stage, a user USR knows two credentials, here user name/password pairs, one U/P for interfacing with an encryption server ES and the other (U/P)s for interfacing with a storage server SS. When the user is aware of the risks, the two pairs of credentials are necessarily different. Those servers typically implemented respective encryption and storage servers. The storage server SS is typically operated by a cloud mass storage provider.

The user USR first authenticates with the encryption server ES using encryption credentials U/P. The encryption server ES then connects the user USR to the storage server SS. Actually the web browser is redirected to storage server SS which is illustrated by the dotted zone on FIG. 1.

The user USR is thus asked to enter his/her storage credentials (U/P)s. This step can be a registration or a connection to a preexisting account of the user at the storage server provider. Once the user USR is authenticated with the storage server SS, this last generates an access token AT and sends it to the encryption server ES. Such an access token AT requires the operation of a three-step process between the two servers according to the Online authentication (OAuth) principles. The generation, processing and use of access tokens according to these principles is already known and not discussed nor developed here. Suffice to say that, using this access token AT, the encryption server ES can act on the behalf of user USR and gain access to the files stored on storage server SS.

The encryption server ES then encrypts the access token AT, and the user master key for encryption Ku using the encryption credential of the user, here his/her password P. The encrypted values of the access token AT and the user master key Ku are stored on the encryption server ES.

The regular functioning of the encryption and storage servers consists in storing data, for example files F1 and F2, in the storage server SS after encryption by the encryption server ES. For this purpose, the encryption server ES uses the unique user master key Ku to encrypt the two files F1 and F2. This encryption process can either use the user master key Ku directly, or generate a separate encryption key for each file and then wrap that file specific key with the user's master key Ku. In both cases, the controlling key is user master key Ku.

Files F1 and F2 are thus encrypted using this key Ku and uploaded to the storage server SS. According to the invention, the encryption server ES further proceeds to two operations on the unique key Ku. It encrypts the unique key Ku using the user encryption credential, here the password P.

The encryption server ES further have an encryption server recovery master key. In the shown example this key is a pair of asymmetric keys Kr_pub and Kr_pr. It is here noted that the encryption server recovery master key can also be used to generate secret keys to be used for encryption. The encryption server recovery master key is thus indirectly used for the encryption of the unique encryption key Ku.

It is here also noted that the term "encryption key" can cover any resource of the encryption server necessary for the data stored in the storage server to be decrypted.

According to the invention, the encryption server ES also encrypts the encryption key Ku using the encryption server recovery master key, here Kr_pub. The encrypted key [Ku] Kr_pub is then sent to the storage server for storage.

The two encryption and storage servers are now bound.

Figure 2:
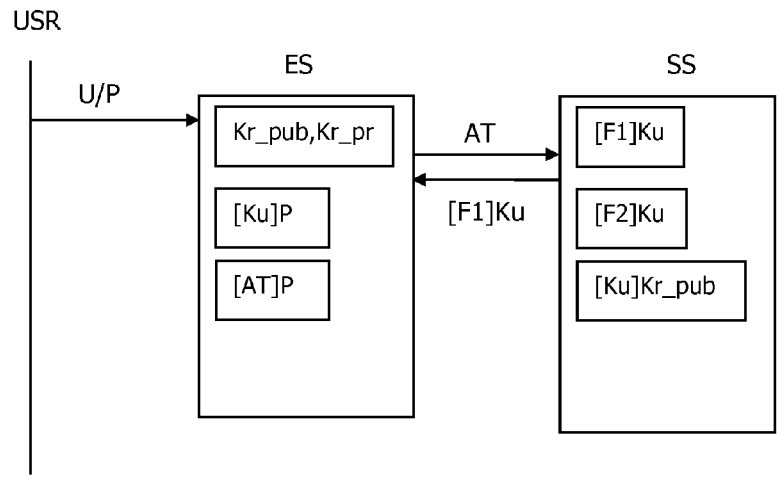
FIG. 2 illustrates the regular operation of the encryption server in combination with the storage server.

FIG. 2 then shows the regular functioning of the bound encryption and storage servers in the case the user knows his/her credentials. The user USR first authenticates with his/her encryption credentials U/P with the encryption server ES. Using the password P, the encryption server ES decrypts the encryption key Ku and the access token AT. It then sends the access token AT to the storage server SS with a request relative to file F1 for example.

After check of the access token AT, the storage server SS delivers the encrypted file [F1]Ku to the encryption server. With the encryption key Ku decrypted using the password P, the encryption server ES is able to decrypt the file F1. The file F1 can then be given to the user in plaintext.

Figure 3:
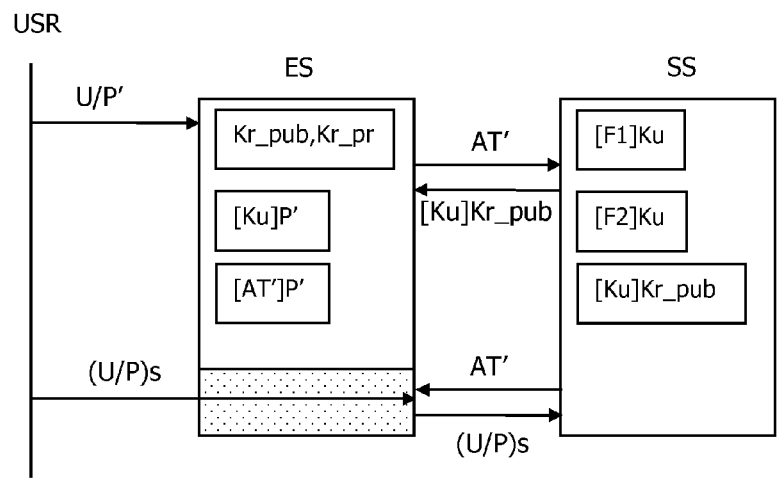
FIG. 3 illustrates the key recovering part of the method of the invention using a new encryption credential.

FIG. 3 illustrates the encryption credential management in the case the user USR forgets his/her encryption credentials (password P). The invention will enable to recover the user's data that was encrypted under a session for which the credential are lost.

The encryption server ES is free to implement its own policy for password reset. For example, the encryption server ES send an email to a registered email account with a link to reset password, etc.

Once he/she is authorized to do so, the user USR inputs a new credential U/P'. The web browser then redirects the user to the storage server page where he/she is invited to authenticate using storage credentials (U/P)s.

A new access token AT' is then generated and provided to the encryption server ES. The encryption server ES stores the access token AT' after encryption using the new encryption credentials, here using the password P'. Then it also submit the access token AT' to the storage server SS with a recovery request. After check of the access token AT', the storage device SS sends the encryption key Ku encrypted using the encryption server recovery master key, here [Ku]Kr_pub.

Using its own recovery master key, the encryption server ES decrypts the encryption key Ku. This decrypted key Ku is then encrypted using the new encryption credential, here password P' and stored by the encryption server.

It further enables the encryption device to recover any data stored after encryption in the storage server.

The invention concerns what occurs when the new password has been set on encryption server SS. The user's ability to login to storage server SS enables the encryption server ES to get the key encrypted using its own recovery key Kr_pub.

FIGS. 1 to 3 does not show explicitly all the part of the encryption server which are an authentication module dedicated to authenticate the user using the user credentials U/P, an encryption/decryption module to encrypt/decrypt as well uploaded data F1,F2, access token AT,AT' and encryption keys Ku using diverse corresponding keys, a memory to store access token AT,AT' and user encryption key Ku encrypted using the encryption credentials U/P and link with a human machine interface for the user USR to input new encryption credentials U/P'.

In the above detailed description, reference is made to the accompanying drawings that show, by way of illustration, specific embodiments in which the invention may be practiced. These embodiments are described in sufficient detail to enable those skilled in the art to practice the invention. It is to be understood that the order according to which the user inputs his data can be modified without departing from the spirit and scope of the invention.

In particular it is here noted that the new encryption credential can be asked at the beginning of the recovery, before or after the reception of the access token or once the encryption key Ku has been recovered using the recovery master key.

In any case, the encryption server ES remains independent in its credential policy. The authorization to reset the password is thus not a part of the invention but an essential prerequisite to open the right to reset the password, this password reset being the source of the problem solved by the invention. Order of the steps/sub-steps in the claims can thus be modified without departing from the scope of the invention.

The above detailed description is, therefore, not to be taken in a limiting sense, and the scope of the present invention is defined only by the appended claims, appropriately interpreted, along with the full range of equivalents to which the claims are entitled.

The invention claimed is:

1. A method to manage modification of encryption credentials for an encryption server, said encryption server being configured to encrypt data uploaded by a user after provision of encryption credentials of the user that are associated with an encryption account, said encrypted data using a user encryption key stored in a cloud storage server,
said method comprising the initialization steps of, for the encryption server, authenticating the user to the encryption account using encryption credentials and binding the encryption account to a user's storage account in the cloud storage server through the following sub-steps:
for the storage server, authenticating the user to his/her storage account using storage credentials, issuing an initial access token based on an online authentication protocol and sending the initial access token to the encryption server, and
for the encryption server, encrypting the initial access token and the user encryption key using the encryption credentials and storing the encrypted initial access token and user encryption key for further use to decrypt the uploaded data under request of the user and provision of his/her encryption credentials, encrypting the user encryption key using an encryption server recovery master key and sending, for storage, the encrypted user encryption key to the storage server,
said method further comprising the following steps, when user triggers an encryption credentials reset,
for the storage server, authenticating the user to his/her storage account using storage credentials, issuing a new access token based on an online authentication protocol and sending the new access token to the encryption server, and
for the encryption server, using the new access token to retrieve the encrypted user encryption key from the storage server, decrypting the encrypted user encryption key using the encryption server recovery master key, requiring new encryption credentials to be input by the user, encrypting the new access token and the plain decrypted user encryption key using the new encryption credentials and storing them for further use to decrypt the uploaded data under request of the user and provision of his/her new encryption credentials.

2. The method according to claim 1, wherein an encryption credential is a user name/password pair.

3. The method according to claim 2, wherein the password is used to encrypt the initial access token and the user encryption key.

4. The method of claim 3, wherein the password is used as an input to a key derivation function, and the resulting key is used to encrypt the initial access token and the user encryption key.

5. The method according to claim 1, wherein the online authentication protocol is a three-steps OAuth handshake.

6. An encryption server adapted to manage modification of encryption credentials according to claim 1, said encryption server being used to encrypt data uploaded by a user after provision of the user's encryption credentials associated with an encryption account, said encrypted data using a user encryption key stored in a cloud storage server, said encryption server including:
- an authentication module to authenticate the user to the encryption account using encryption credentials,
- an encryption/decryption module to encrypt/decrypt access tokens as provided by the storage server and the user encryption key using the encryption credentials, to encrypt/decrypt uploaded data using user encryption key, to encrypt/decrypt the user encryption key using an encryption server recovery master key before sending to the storage server and when the encrypted user encryption key is retrieved from storage device,
- a memory to store access token and user encryption key encrypted using the encryption credentials, and
- a link with a human machine interface for the user to input new encryption credentials.

\* \* \* \* \*